United States Patent Office 3,516,973
Patented June 23, 1970

3,516,973
PROCESS FOR THE POLYMERIZATION
OF β-LACTONES
Rikitaro Kato, Tokorozawa-shi, and Syoichi Nagato and
Juro Suzuki, Saitama, Japan, assignors to Daicel Ltd.,
Osaka, Japan, a corporation of Japan
No Drawing. Filed Mar. 25, 1968, Ser. No. 715,539
Claims priority, application Japan, Apr. 1, 1967,
42/20,641
Int. Cl. C08g 17/017
U.S. Cl. 260—78.3      6 Claims

ABSTRACT OF THE DISCLOSURE

A process for polymerizing β-lactones so as to obtain a colorless product in high yield at relatively low temperatures by polymerizing or copolymerizing α,α-disubstituted β-lactones in the presence of a catalyst consisting of an alkali or alkaline earth metal salt of an imide.

BACKGROUND OF THE INVENTION

Field of the invention

This invention relates to a process for polymerizing or copolymerizing α,α-disubstituted β-lactones and, more particularly, relates to a process for polymerizing or copolymerizing α,α-disubstituted β-lactones in the presence of an alkali or alkaline earth metal salt of an imide which is obtained by substituting the active hydrogen of the imide group with an alkali or alkaline earth metal.

DESCRIPTION OF THE PRIOR ART

It is known from French Pat. 1,231,163 that β-lactones can be polymerized by employing a catalyst such as tertiary amines, betaines or alkali metal salts of organic acids. It was found that the most effective catalysts for use in the ring-opening polymerization of β-lactones were triethylamine and triethylenediamine. However, when tertiary amine catalysts are used, the thermal stability of the polymer may vary considerably according to the nature of the catalyst and a higher reaction temperature results in a discolored product. Further it is previously known that a Friedel-Crafts catalyst, such as ferric chloride, boron trifluoride and titanium tetrachloride, may also be used in the ring-opening polymerization of β-lactones but the polymers prepared are not of very high molecular weight and are of limited usefulness.

SUMMARY OF THE INVENTION

Accordingly, it is an object of this invention to provide a process for preparing high molecular weight linear polyesters in high yeld at relatively low temperatures. It is a further object to provide a colorless polyester product.

It has been discovered that these objects may be accomplished by providing a process for polymerizing or copolymerizing α,α-disubstituted β-propiolactones in the presence of an alkali or alkaline earth metal salt of an imide, as a catalyst.

The α,α-disubstituted β-propiolactones which may be polymerized according to the invention have the general chemical formula:

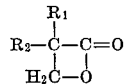

wherein $R_1$ and $R_2$ are the same or different alkyl radicals having from 1 to 4 carbon atoms. In case of $R_1=R_2=CH_3$, $R_1=R_2=C_2H_5$ and $R_1=C_2H_5$, $R_2=C_4H_9$ the starting materials are α,α-dimethyl β-propiolactone or pivalolactone, α,α-diethyl β-propiolactone and α-ethyl-α-butyl β-propiolactone, respectively.

Examples of imide salt compounds which are suitable catalysts in the process of the present invention include compounds of the formula

wherein M is an alkali or alkaline earth metal. A partial list of such compounds includes potassium and sodium salts of succinimide, phthalimide and pyromellitimide. Further, it is to be understood that the imide salts to be used in the present invention include imide salts derived from high molecular weight imide compounds. The imide salt employed may be an alkali or alkaline earth metal salt of polyimides having a terminal imide radical which can be synthesized from pyromellitic acid anhydride and aromatic diamines.

The concentration of the catalyst in the reaction mixture can be widely varied. Usually, the concentration of the catalyst is from 1 to 10% by weight, based on the total weight of the monomer(s). Concentrations of less than 1% by weight are not desirable because of the insufficient activity of the catalyst. Concentrations in excess of 10% by weight give rise to undesirable effects, such as the discoloration of the polyester product.

The polymerization is generally carried out at temperatures ranging from 40° C. to 250° C., although temperatures of 60° C. to 180° C. are preferred. Temperatures above 250° C. are not desirable because of the tendency of the polymer formed to degrade. Temperatures below 40° C. give rise to a slow polymerization rate.

In general, the reaction time will vary depending upon the operative temperature, the particular catalyst and the concentration employed and other factors. Preferably, the polymerization reaction is conducted in an inert atmosphere, such as nitrogen or helium, or in a vacuum. Where an inert atmosphere is employed, the pressure is generally atmospheric. The polymerization reaction according to the present invention can be carried out in the presence of an inert diluent. Suitable diluents are hydrocarbon solvents, such as benzene, toluene and xylene.

According to the present invention, there is also provided a process for the copolymerization of the α,α-disubstituted β-propiolactone with other polymerizable cyclic monomers. Such other cyclic monomers include lactides, such as cyclic anhydride of glycolic acid and cyclic anhydride of lactic acid.

It is preferred to define the polymers of the present invention with respect to their molecular weight or degree of polymerization in terms of their intrinsic viscosity, which term is defined by the following equation:

$$[\eta] = \lim_{C \to 0} (\ln \eta\mathrm{rel.}/c)$$

wherein the relative viscosity $\eta_{\mathrm{rel.}}$, is calculated by dividing the flow time, in a capillar viscometer, of a dilute solution of the polymer in the following named solvent by the flow time for the pure solvent [solvent=O-chlorophenol-O-cresol (of a weight ratio of 1:1)]. The polymer is dissolved in this solvent by heating it at 150° C. for 5 minutes. The measurement is carried out at 30° C. The polymers which are suitable for applications as films and fibers have intrinsic viscosities of at least 0.4 and preferably at least 0.7. The polymers obtained according to the present invention exhibit very attractive properties. They withstand high temperatures and possess satisfactory mechanical properties. These polymers are suitable for numerous applications, such as the manufacture of threads, fibers and films and the molding of objects.

A desirable series of copolymers ranging from tough polymers, which are crystalline in character, to soft amorphous polymers can be obtained by varying the copolymerization composition.

The polymerization process employed in the present invention has the advantages of providing higher polymer yields, higher molecular weight resins and colorless solids as compared to the polymerization processes heretofore employed for the polymerization of α,α-disubstituted β-lactones.

Among the imide salts used in the present invention, the dipotassium salt of pyromellitimide has not been known in the prior art and it can be synthesized, for example, as shown in the following.

5 parts by weight of pyromellitic acid were dissolved in an excess of 28% aqueous ammonia solution to obtain 5.7 parts by weight of the ammonium salt of the acid. This ammonium salt was heated at 260° C. until ammonia was no longer evolved to obtain 3.7 parts by weight of pyromellitimide. The nitrogen content of the imide recrystallized from pyridine by elemental analysis showed a value of 13.05% by weight. The theoretical value was 12.96%. 50 parts by volume of ethyl alcohol containing 0.54 part by weight of potassium hydroxide were added to a solution consisting of 1 part by weight of the thus obtained pyromellitimide dissolved in 50 parts by volume of pyridine, and then ether was added thereto, thus obtaining the dipotassium salt of pyromelllitimide. The analysis for nitrogen showed a value of 9.92% by weight. The theoretical value was 9.60%.

DESCRIPTION OF THE PREFERRED EMBODIMENTS

The invention will now be described with reference to the following examples which will show the preferred embodiments of the present invention. However, these examples are not intended to limit the invention.

Example 1

0.02 part (all references to "parts" in this and the following example refer to parts by weight) of potassium salt of phthalimide was added to 0.99 part of pivalolactone placed in a polymerization vessel. The atmosphere was replaced with nitrogen and then the polymerization vessel was sealed and the reaction mixture was maintained at 60° C. for 120 hours. After the reaction was completed, the polyester was separated, filtered, washed with methyl alcohol and dried in vacuo. 0.94 part of polypivalolactone having an intrinsic viscosity of 1.64 was obtained. It had a melting point so that it could be manually melt-spun into long fibers.

Example 2

0.015 part of the potassium salt of phthalimide was added to 1.47 parts of pivalolactone and the mixture was treated in exactly the same manner as in Example 1 to obtain 1.44 parts of a polymer having an intrinsic viscosity of 3.76 and which was capable of being manually melt-spun into fibers.

Example 3

The dipotassium salt of pyromellitimide was used instead of the potassium salt of phthalimide and the mixture was treated in exactly the same manner as in Example 1 to obtain 0.93 part of a polymer having an intrinsic viscosity of 3.12.

Example 4

0.04 part of the potassium salt of phthalimide was added to a mixture of 1.98 parts of pivalolactone and 0.144 part of a lactide (cyclic anhydride of lactic acid) and the mixture was treated in exactly the same manner as in Example 1. Thus 1.84 parts of a copolymer having an intrinsic viscosity of 0.48 were obtained. Its melting point was 227 to 233° C. The polymer could be molded into tough self-supporting films. The polymer could also be melt-spun into cold-drawable fibers.

What we claim is:

1. A process for polymerizing β-lactones which comprises polymerizing an α,α-disubstituted β-lactone selected from the group consisting of α,α-dimethyl β-propiolactone, α,α-diethyl β-propiolactone and α-ethyl-α-butyl β-propiolactone in the presence of an alkali metal salt of an imide selected from the group consisting of succinimide, phthalimide and pyromellitimide obtained by substituting the active hydrogen of the imide radical with an alkali metal, as a catalyst.

2. The process as claimed in claim 1, wherein said alkali salt of an imide is the potassium salt of phthalimide.

3. The process as claimed in claim 1, wherein said alkali salt of an imide is the dipotassium salt of pyromellitimide.

4. The process as claimed in claim 1, wherein the amount of said catalyst is 1 to 10% by weight based on the weight of said α,α-disubstituted β-lactone.

5. A process for polymerizing β-lactones which comprises polymerizing an α,α-disubstituted β-lactone of the formula

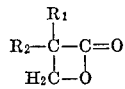

wherein $R_1$ and $R_2$ are alkyl radicals having 1 to 4 carbon atoms, in the presence of an alkali metal salt of an imide selected from the group consisting of succinimide, phthalimide and pyromellitimide obtained by substituting the active hydrogen of the imide radical with an alkali metal, as a catalyst.

6. A copolymerization process which comprises copolymerizing (1) a cyclic monomer selected from the group consisting of cyclic anhydrides of glycolic and lactic acids and (2) an α,α-disubstituted β-lactone of the formula

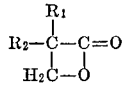

wherein $R_1$ and $R_2$ are alkyl radicals having 1 to 4 carbon atoms, in the presence of an alkali metal salt of an imide selected from the group consisting of succinimide, phthalimide and pyromellitimide obtained by substituting the active hydrogen of the imide radical with an alkali metal, as a catalyst.

References Cited

FOREIGN PATENTS 1,016,394    1/1966    Great Britain.

WILLIAM SHORT, Primary Examiner

E. A. NIELSEN, Assistant Examiner